Figure 1:
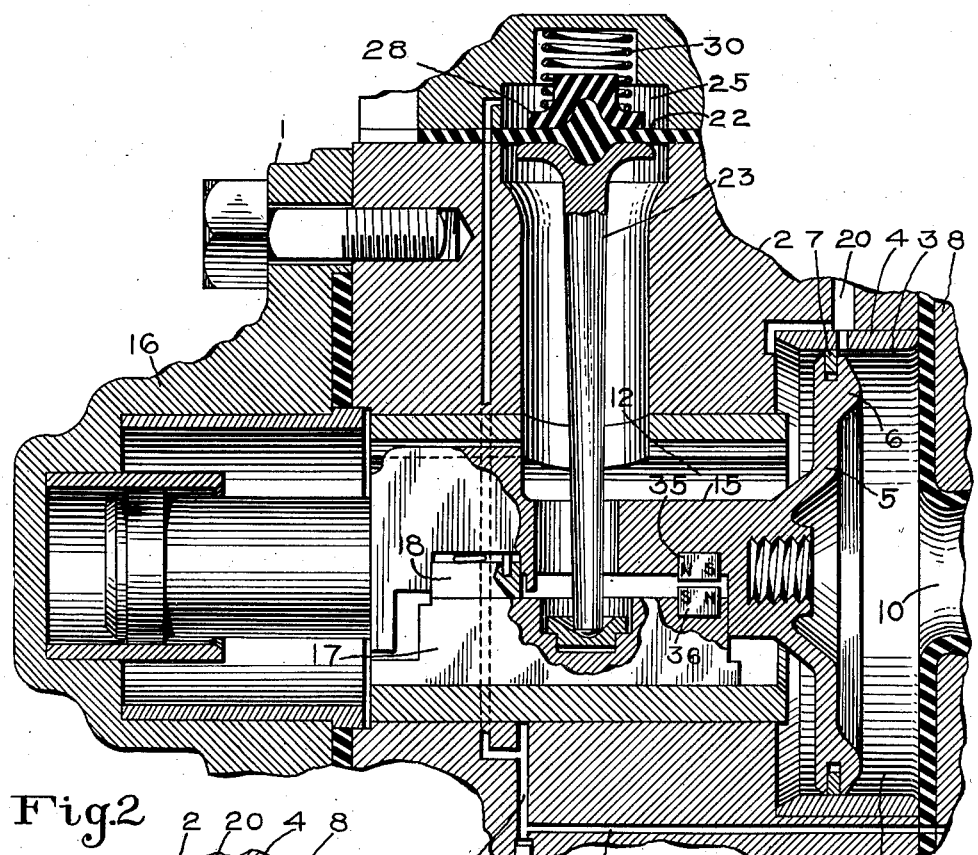

May 22, 1945.   C. D. STEWART   2,376,521
VALVE DEVICE
Filed March 23, 1943

INVENTOR
Carlton D. Stewart
BY
ATTORNEY

Patented May 22, 1945

2,376,521

UNITED STATES PATENT OFFICE 2,376,521

VALVE DEVICE

Carlton D. Stewart, Wilkinsburg, Pa., assignor to The Westinghouse Air Brake Company, Wilmerding, Pa., a corporation of Pennsylvania Application March 23, 1943, Serial No. 480,155

8 Claims. (Cl. 303—1)

This invention relates to valve devices and more particularly to the type embodying a piston arranged to be moved by a differential between fluid pressures acting on its opposite sides.

In air brake devices, such as employed on railway vehicles, pistons are employed for operation upon a change in air pressure in a control pipe and thereby on one side of the piston, to effect an application of the brakes on the vehicle, a release of the brakes, or other desired brake controlling operations. The pistons are arranged to reciprocate in cylinder bores, and in accordance with usual practice, the pistons comprise piston heads of a diameter somewhat less than that of the bores and each head is therefore provided with a ring groove carrying a ring which is expanded into contact with the wall of the respective bore to provide a leak tight seal between the piston and the wall.

Due to the fact that the diameter of a piston head, such as above described, is slightly less than that of the bore in which it operates, the piston head is capable of a certain degree of radial movement relative to the ring and the wall of the piston bore. This relative movement is slight and resisted by friction between the ring and the side walls of the ring groove in the piston head. Nevertheless, in a brake device applied to a railway vehicle which at times is subject to severe shocks, due for instance to the vehicle wheels striking uneven joints between the rails in a track, the resulting vibrations set up in the vehicle are liable to cause such relative movement between a piston head and the wall of the bore in which it operates as to undesirably create hammer-like blows between the piston head and the wall. In time these blows may result in a groove being worn in the wall of the bore at either side of the ring where the piston head comes in contact with said wall. If the piston is arranged with its axis horizontal, the grooves may be worn only in one side of the cylinder wall, but if its axis is vertical the grooves may extend completely around the wall. In brake controlling valve devices, such as the "AB" and other types of devices, this grooving of the piston cylinder wall is most likely to occur in the brake release position since the piston occupies this position the major portion of the time that a vehicle is in use.

This grooving of a cylinder wall is of course very objectionable, particularly in air brake devices, because it tends to create or increase leakage of fluid under pressure from one side of the piston to the other and thereby reduce its sensitivity to variations in fluid pressure on one side thereof, and in case the leakage becomes sufficiently great, it might even result in failure of the piston to respond to a normal variation in fluid pressure. Moreover, the piston head or ring is liable to catch on a side of the grooves worn in the bore and as a consequence require a greater than normal pressure differential to start it moving out of its release position. In such a case, when it does start moving, it might then pump or over travel a desired position and thereby cause an undesired operation.

One object of the invention is therefore the provision of novel means for avoiding the above difficulty.

Another object of the invention is the provision of novel means for holding the piston head against radial movement relative to the wall of the bore in which it is disposed for operation.

Other objects and advantages will be apparent from the following more detailed description of the invention.

Figure 2:
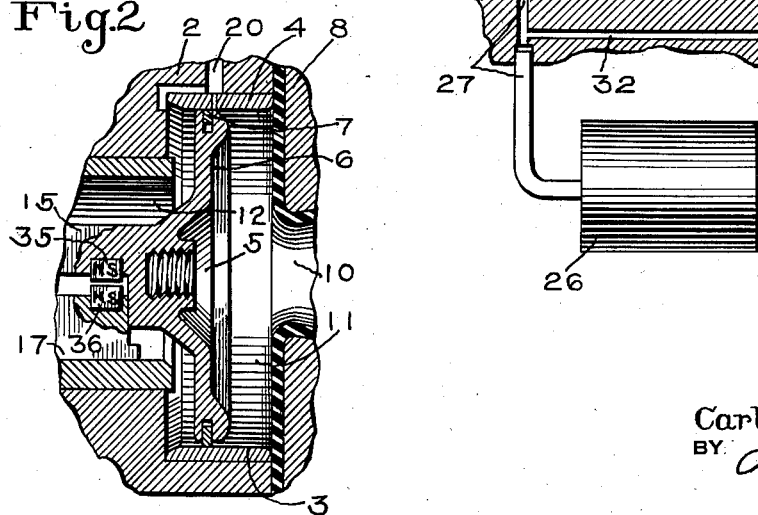

In the accompanying drawing; Fig. 1 is a sectional view of a portion of a fluid pressure brake device embodying one form of the invention; Fig. 2 is a sectional view of a portion of the valve device shown in Fig. 1 embodying another form of the invention.

The two embodiments of the invention are shown in the drawing associated with a portion of a brake controlling valve device 1, which for the purpose of illustration may be the emergency portion of the well known "AB" type of control valve device disclosed in Patent No. 2,031,213, issued to Clyde C. Farmer on February 18, 1936. Since reference may be made to this patent, only such parts of the "AB" valve device which are considered pertinent to the invention are shown in the drawing and the following description of such parts will also be limited to only those deemed necessary for a clear and comprehensive understanding of the invention.

As shown, in the drawing, the brake controlling valve device 1 comprises a casing 2 having at one end a bore 3 which is lined with a bushing 4 having in turn a bore in which is slidably mounted a piston 5. The piston 5 comprises a piston head 6 of a diameter slightly less than that of the bore in bushing 4. The piston head 6 is provided around its periphery with a groove in which is mounted a ring 7 expanded into contact with the wall of said bore, the ring being provided to prevent leakage of fluid under pressure from one side of the piston to the opposite side.

The bore in bushing 4 is open at one end of the casing 2 and this open end is closed by a cover member 8, only a portion of which is shown in the accompanying drawing. In the "AB" valve device disclosed in the patent above referred to, the cover member 8 constitutes a pipe bracket for supporting the casing 2 and through this pipe bracket, by way of a cavity 10, communication is established between the usual brake pipe (not shown), on a vehicle and a chamber 11 provided between the piston head 6 and cover member 8. At the opposite side of the piston 5 is a valve chamber 12. The piston has a stem 15 extending through this chamber into the bore of a bushing rigidly mounted in a cover member 16 wherein the end of the stem is supported and arranged to slide upon reciprocation of piston 5.

The piston stem 15 is constructed and arranged to operate a main slide valve 17 and an auxiliary slide valve 18 contained in the valve chamber 12. This chamber is connected to the chamber 11 at the opposite side of the piston by way of a port 20, in the usual manner, when the piston is in the position shown in the drawing, so that the pressure on opposite sides of the piston is normally equalized.

For the purpose of maintaining the main slide valve 17 in engagement with its seat when the pressure of fluid in chamber 12 is reduced, a loading mechanism is provided. This mechanism may comprise a flexible diaphragm 22 which is mounted in the casing and operatively engages a rocking pin 23 through which a loading force is adapted to be transmitted from the diaphragm to the main slide valve 17. The valve chamber 12 is open to the under side of the diaphragm and at the other side of the diaphragm there is a chamber 25 which, in the present embodiment of the invention, is connected to the usual emergency reservoir 26 by way of a passage and pipe 27. Contained in the diaphragm chamber 25 and interposed between and operatively engaging the casing and a spring seat member 28, which is in operative engagement with the diaphragm 22, is a coil spring 30 which acts, at all times, to hold the main slide valve 17 to its seat.

In accordance with the teachings of the hereinbefore mentioned Farmer patent, the emergency reservoir is charged with fluid under pressure through a passage 32 which is connected to passage 27 and which extends through the pipe bracket to the usual service portion (not shown).

In the drawing the piston 5 is shown in its brake release position which it occupies for the major portion of the time a railway vehicle is in use. The piston is arranged to move from this position through its full traverse in the direction of the cover or pipe bracket 8 to its emergency brake application position upon an emergency reduction in pressure of fluid in chamber 11, and to move back from its emergency position to the position in which it is shown upon a subsequent increase in pressure in chamber 11 to effect a release of the brakes.

According to the invention the under side of the piston stem 15 is recessed to receive a permanent magnet 35. The upper side of the main slide valve 17 is also recessed to receive a similar permanent magnet 36. The magnets 35 and 36 are disposed in vertical alignment and the adjacent faces of the magnets are spaced apart.

It should here be understood that the piston stem 15 and the slide valve 17 are made of non-magnetic material, such for instance as brass and that the permanent magnets 35 and 36 are made from iron or the like.

In Fig. 1 of the accompanying drawing the magnets 35 and 36 are arranged with opposite poles disposed adjacent each other. With the magnets 35 and 36 thus arranged, the flux passing from one to the other will act to pull the magnets 35 and 36 and thereby the piston stem 15 and the slide valve 17 toward each other. It will here be noted that the spring 30 in the loading mechanism has sufficient strength to maintain the slide valve 17 seated against the pulling action of the magnets so that the peripheral surface of the piston head 6 is urged or biased radially downwardly, through the medium of the piston stem 15, into engagement with one side of the bore in bushing 4 as shown. It will be understood that the magnets 35 and 36 will urge the peripheral surface of the head 6 of the piston 5 into engagement with the cylinder wall with a force sufficient to prevent radial movement between the piston head and the cylinder wall and thus avoid grooving of the cylinder wall such as hereinbefore described.

It should here be mentioned that if desired one permanent magnet and one block of magnetic material, such for instance as iron may be used in place of two permanent magnets and that the permanent magnet may be disposed either in the piston or in the slide valve with the same results as already described by the use of two permanent magnets, provided the permanent magnet has sufficient biasing power to maintain the head 6 in contact with the bushing 4.

In Fig. 2 the permanent magnets 35 and 36 are arranged with like poles disposed adjacent each other. With the magnets disposed in this manner and with the slide valve 17 maintained in engagement with its seat by spring 30 in the slide valve loading mechanism, a lifting force is transmitted through the piston stem 15 to the head 6 of the piston. The lifting force thus transmitted by the magnets to the head 6 is sufficient to urge or bias the peripheral surfaces of the head 6 radially upward as viewed in Fig. 2, into contact with the upper side of the bore in the bushing 4.

From the foregoing description of the invention it will be seen that the permanent magnets are employed for applying a radially acting force to a piston head for biasing same into contact with a portion of the wall of the piston cylinder or bore in which the piston is arranged to reciprocate, with a force sufficient to prevent relative movement between the piston head and the wall due to vibrations of the brake controlling valve device incident to shocks to which it is subjected in service. Grooving of the cylinder wall and possible consequent failure of the device to operate as intended, will thereby be avoided.

Both of the present embodiments of the invention have been shown associated with the emergency piston of the wall known "AB" brake controlling valve device, this, however, is merely for illustration, and it will be understood that the invention is applicable to any piston.

Having now described my invention, what I claim as new and desire to secure by Letters Patent is:

1. In combination, a casing having a piston bore, a piston head disposed to reciprocate in said bore, a stem carried by said piston head, and magnetic means arranged to act on said stem for urging said head radially against the wall of said bore.

2. In combination, a casing having a piston bore, a piston comprising a head mounted to reciprocate in said bore and having a stem, and magnetic means including an element carried by said stem arranged to act on said stem for urging said head radially against the wall of said bore.

3. In combination, a casing having a piston bore, a piston head disposed to reciprocate in said bore, a stem carried by said head, and a pair of permanent magnets arranged to act on said stem for urging said head radially against the wall of said bore.

4. In combination, a casing having a piston bore, a piston comprising a head mounted to reciprocate in said bore and having a stem, and a pair of permanent magnets one of which is carried by said stem and arranged to act on said stem for urging said head radially against the wall of said bore.

5. In combination, a casing having a piston bore disposed horizontally of said casing, a piston including a head with a diameter less than the diameter of said bore mounted to reciprocate in said bore and having a stem, and magnetic means arranged to act on said stem for urging said head downwardly radially against the horizontally disposed lower portion of the wall of said bore.

6. In combination, a casing having a piston bore disposed horizontally of said casing, a piston including a head with a diameter less than the diameter of said bore mounted to reciprocate in said bore, a stem carried by said head, and a pair of permanent magnets arranged to act on said stem for biasing said head upwardly radially against the horizontally disposed upper portion of the wall of said bore.

7. In combination, a casing having a piston bore, a piston including a piston head disposed to reciprocate in said bore and having a stem, a slide valve operatively connected to said stem, magnetic means including an element carried by said stem and another element carried by said slide valve arranged to hold said head against radial movement relative to the wall of said bore, and means for maintaining said slide valve against movement by the action of said magnetic means.

8. In combination, a casing having a piston bore, a piston including a piston head disposed to reciprocate in said bore and having a stem, a slide valve operatively connected to said stem, a pair of permanent magnets one of which is carried by the piston stem and the other carried by said slide valve for biasing said piston head into engagement with one side of said piston bore, and means for maintaining said slide valve against movement by action of said magnetic means.

CARLTON D. STEWART.